July 5, 1932. A. A. CRIQUI ET AL 1,866,196
GAS PURIFIER OR SCRUBBER
Filed April 23, 1928 2 Sheets-Sheet 2
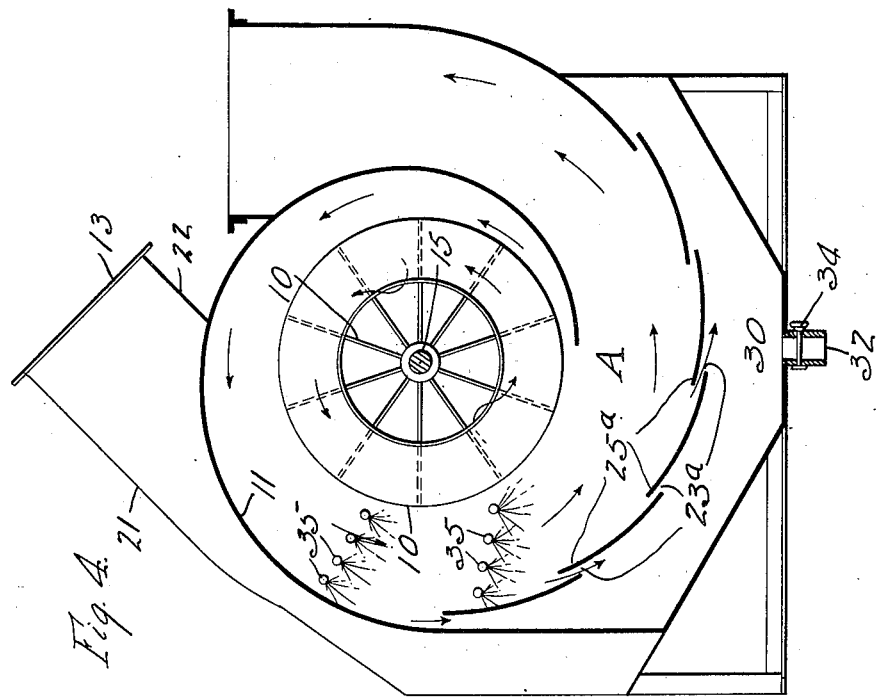
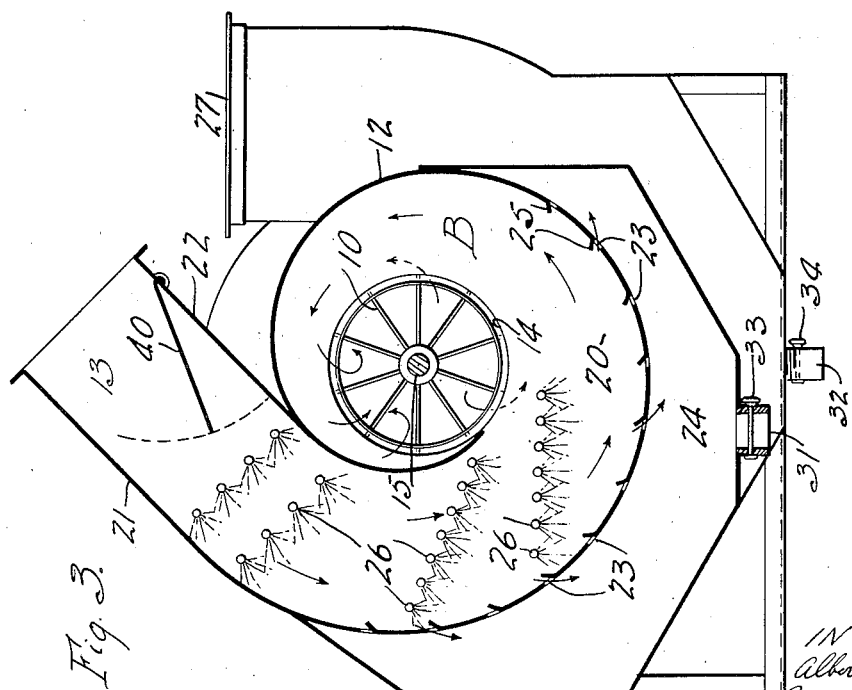
INVENTOR.
Albert A. Criqui
and Roger J. Thornton
by Parker & Prochnow
ATTORNEYS.

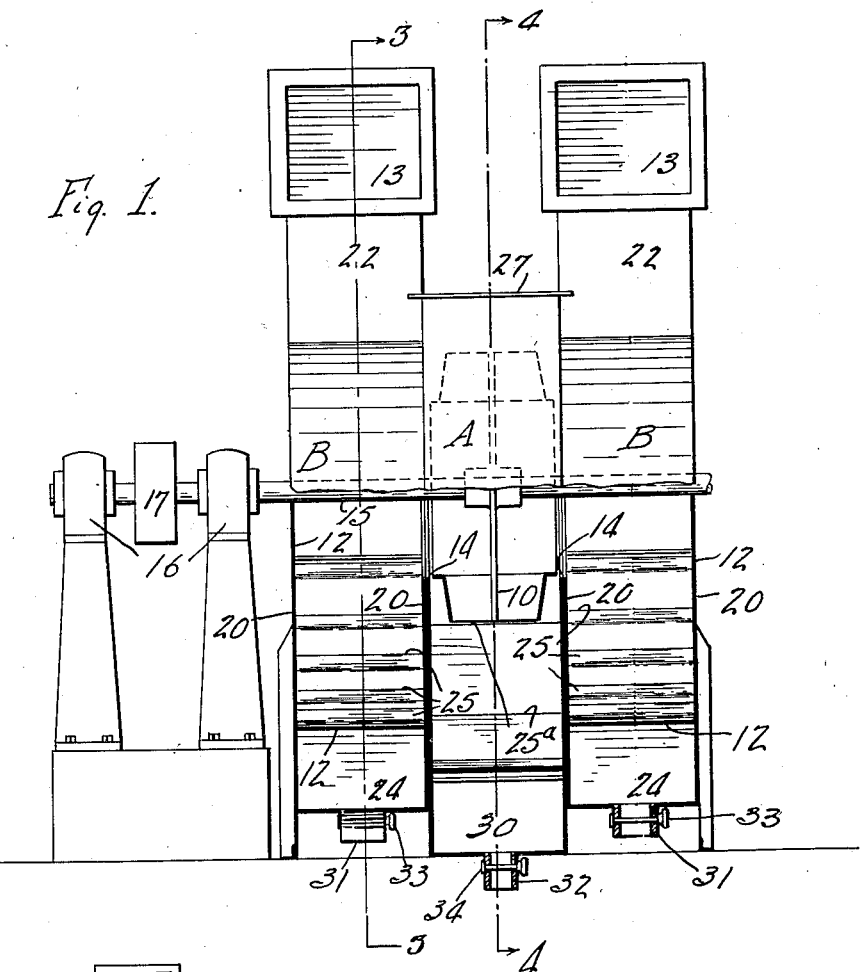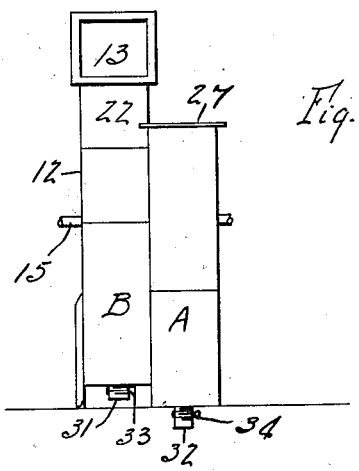

Patented July 5, 1932

1,866,196

UNITED STATES PATENT OFFICE

ALBERT A. CRIQUI AND ROGER T. THORNTON, OF BUFFALO, NEW YORK, ASSIGNORS TO BUFFALO FORGE COMPANY, OF BUFFALO, NEW YORK

GAS PURIFIER OR SCRUBBER

Application filed April 23, 1928. Serial No. 272,044.

This invention relates to gas purifiers or separators for separating finely divided solid material and other foreign matter from air and other gases, and more particularly the invention relates to gas purifiers in which the gas, propelled by a fan, is caused to flow rapidly in a spiral path in a chamber having a spiral or volute-shaped wall against which the foreign matter is thrown by centrifugal force, and which wall is provided with openings through which the foreign matter carried by the gas is adapted to pass, being thus separated from the gas.

One object of the invention is to produce a gas purifier or separator which is adapted for separating very fine dust, such for instance as fine coal dust, from air or other gases, and which is of simple construction and will be efficient in operation and require the minimum power for operation.

Other objects of the invention are to produce a centrifugal gas purifier or separator of a novel construction, such that while it may be of moderate size and require only moderate power for operation, it will have a separating capacity and efficiency equal to previous types of separators which are of much larger size, more complicated construction and require much greater power for operation; also to provide a centrifugal gas purifier comprising a centrifugal fan, and an inlet or separating chamber which is of spiral or volute form, having an inlet for air or gas at its outer peripheral portion and through which the air or gas travels in a spiral path of decreasing radius into the central eye of the fan casing, the spiral wall of the inlet chamber having openings through which the foreign matter, skimmed off of the outer portion of the spirally moving column of air or gas, passes and is thus separated from the air or gas.

Additional objects are to provide a multi-stage centrifugal gas purifier comprising one stage in the form of a spiral or volute chamber which the air or gas enters tangentially or at its outer, peripheral portion and through which it passes in a spiral path of decreasing radius into the eye of a second stage in the form of a centrifugal fan which operates to draw the air or gas through the first stage and propel the same through the second stage, and which second stage has a spiral or volute chamber through which the air or gas travels in a spiral path of increasing radius and from which it discharges at the outer, peripheral portion of the fan chamber; and also to improve gas purifiers or separators in the other respects hereinafter described and set forth in the claims.

In the accompanying drawings:

Fig. 1 is a side elevation, partly in section of a multi-stage gas purifier embodying our invention, and showing the application of the same to a separator having two preliminary or entering stages and a fan stage common to the two inlet stages.

Fig. 2 is a similar elevation on a reduced scale, of a gas purifier comprising a fan stage and a single preliminary or entering stage.

Fig. 3 is a transverse, sectional elevation of the separator shown in Fig. 1, on line 3—3, Fig. 1.

Fig. 4 is a similar sectional elevation of the same on line 4—4 of Fig. 1.

In both embodiments of the invention, as illustrated in the drawings, the separator comprises a centrifugal fan or second separating stage A in which a fan wheel 10 rotates in a spiral or volute shaped casing 11, and an entering chamber or first stage B having a spiral or volute shaped casing 12 provided with an inlet 13 for the air or gas arranged tangentially or at the outer, peripheral portion of the casing and with a central outlet 14 through which the air or gas passes from the first stage B into the fan A.

The two constructions shown are substantially similar except that in the construction shown in Fig. 2, only one entrance stage B is provided, whereas in the construction shown in Figs. 1, 3 and 4, two of the entrance stages B are provided, the same being located at opposite ends of the centrifugal fan and arranged to deliver the air or gas into the fan A through central openings 14 at its opposite sides.

The fan wheel 10 may be of any suitable construction and may be rotatably mounted in the casing 11 in any suitable manner and may be driven by any suitable drive means. As shown, the fan wheel 10 is mounted on a horizontal shaft 15 which extends centrally through the casings or stages A and B and is journalled in suitable bearings 16, two of which are shown at one end of one of the stages B, the shaft being provided with a drive pulley 17. The casings of the two stages A and B are preferably arranged horizontally, that is so that their spiral or volute walls curve around the horizontal axis of the fan wheel 10.

The casing of the separating stage B, as shown, has opposite, vertical end walls 20 connected by a spiral or volute-like wall 12. At the outer peripheral portion of the casing, walls 21 and 22 extending tangentially from the outer and inner portions of the spiral wall 12 and connected by corresponding extensions of the end walls 20 form the tangential inlet 13 for the air or gas. The inner end of the spiral wall terminates substantially at the edge of the central discharge opening 14 in the inner end wall. Thus, the air or gas which is drawn in through the inlet 13 by the fan wheel is caused to follow a spiral path of decreasing radius and pass through the opening or communication 14 into the casing of the fan A.

Openings 23 are provided in the spiral wall 12 through which openings dust or foreign matter carried by the air or gas can pass from the spiral chamber into a receiving chamber 24 arranged outside of the spiral wall. The openings 23 are preferably in the form of narrow slots extending across the spiral wall from one end to the other of the casing and, preferably, the spiral wall is provided at the rear edge of each of the slots 23 with an inwardly directed or inbent edge 25 which acts as a deflector or skimmer to deflect the dust or foreign matter through the slots 23 into the receiving chamber 24. Fig. 3 shows the deflectors 25 formed by inbent portions of the wall 12, but the slots and deflectors could be of different formation, for instance, as shown in Fig. 4, in which the spiral wall of the fan casing is composed of curved plates arranged with the rear edge of one plate overlapping and spaced from the front edge of the next plate, thus forming inwardly directed deflecting edges 25a separated by intervening slots 23a.

In the spiral movement of the air or gas through the spiral chamber B, the dust or foreign matter carried by the air or gas is thrown by centrifugal force outwardly against the spiral wall 12, and the slots 23 for the escape of the foreign matter are preferably provided only in that portion of the spiral wall where the matter passing through the slots can fall by gravity into the receiving chamber 24 and cannot fall back into the spiral chamber, as would be the case if the slots were provided in the upper portion of the wall. Therefore, the upper inner portion of the spiral wall is imperforate and the slots are formed only in that portion of the wall which does not extend substantially above the horizontal plane of the center of the spiral.

26 represents spray devices adapted to spray water or other suitable liquid into the spiral chamber B, preferably in a direction toward the wall 12 so that dust-ladened air or gas flowing through the spiral chamber will meet the liquid spray and the liquid and dust will be thrown out against the spiral wall. The spray devices may be of any suitable construction and disposition adapted to ensure contact of the spray with the air or gas throughout the whole cross area of the chamber.

The casing of the fan A is preferably substantially similar to the casing of the stage B but the spiral walls of the two casings are oppositely or reversely arranged so that the air or gas which is drawn by the centrifugal fan 10 through the separating stage B in a spiral path of decreasing radius will travel in a spiral path of increasing radius through the spiral fan chamber and discharge through an outlet 27 arranged tangentially or at the outer peripheral portion of the fan casing.

The spiral wall 11 of the fan chamber is preferably provided with openings or slots 23a through which the dust or foreign matter carried by the air or gas can pass into a second receiving chamber 30, and preferably, as in the case of the stage B, only the lower portion of the wall is slotted or perforated, and the upper portion thereof is imperforate, the slotted portion not extending substantially above the axis of the fan. As above explained, the slots 23a in this wall are shown as being formed by narrow spaces between the overlapping ends of curved plates forming this lower portion of the spiral wall 11. The receiving chambers 24 and 30 are provided with suitable outlet openings or pipes 31 and 32 respectively, normally closed by gates or valves 33 and 34 for the dust and liquid separated from the air or gas. Spray devices 35 are also shown for spraying liquid into the spiral fan chamber A and these can be used or not, as found necessary, depending upon the nature of the material for which the purifier may be used.

In the operation of the purifier or separator, the fan being set in rotation, draws the dust-ladened air or gas through the inlet 13 into the spiral chamber of the stage B and causes the air or gas to travel rapidly through this chamber in a spiral path of decreasing radius, and the air or gas enters the fan through the central eye or opening 14 and is thrown out centrifugally by the fan wheel and caused to travel in a spiral path of increasing radius through the spiral fan chamber A and discharge from the outlet or discharge opening 27 at the outer peripheral portion of the fan casing. The inlet portion of the spiral chamber of the stage B may be substantially filled with liquid spray from the spray devices 26, and as the dust-ladened air or gas circulates through the stage B, the dust and liquid will be thrown against the spiral wall 12 and will be directed by the deflectors 25 through the slots 23 into the receiving chamber 24 and thus separated from the air or gas.

As the air or gas continues through the spiral fan chamber A, the dust or foreign matter remaining in the air or gas will be thrown out against the spiral wall 11 of the the fan stage and will be similarly directed through the slots 23a into the receiving chamber 30. The air or gas is thus subjected to successive separating treatments, and the air or gas will leave the discharge opening 27 of the fan in a purified condition, or substantially free from dust or heavier foreign matter. The liquid is thrown out against the spiral wall and covers the same with a flowing film of liquid which is skimmed from the spirally travelling stream of air or gas and directed through the slots in the spiral wall by the deflectors, and the dust adheres to or mixes with the flowing films of liquid on the portions of the spiral wall between the slots and is carried or floated with the liquid through the slots.

The apparatus as thus constructed and operated is especially adapted for separating very fine coal dust from air or gases. This dust is of an oily or greasy nature and is so fine and light that it will not readily mix with liquid, but will float thereon. In the treatment of such material by the apparatus, the fine coal dust will adhere to the films of liquid on the spiral wall and will be floated by the films and carried therewith through the slots in the wall.

Since the motion of the air or gas in the chambers A and B is spiral in upright planes, and the foreign matter passes through separating slots at the lower portions of the spirals into closed receiving chambers in which the static pressure is substantially the same as in the chambers A and B, the foreign matter can fall through the slots by gravity, but will not return through the slots into the chambers A and B. If the chambers and the slots 23 and 23a were vertical instead of horizontal, as shown, the dust or foreign matter which passed out through the upper portions of the slots could return through the lower portions of the slots, thus lessening the efficiency of the apparatus.

Some kinds of dust or material can be efficiently separated from air or gas by the described separator without the necessity for the liquid spray, and in treating such material the sprays can be shut off or the spray devices omitted.

A volume regulator or damper 40 is preferably provided in the gas inlet 13 of the entrance stage B. This regulator preferably consists of a plate hinged at its outer end at the inner side 22 of the inlet 13, with the free inner end of the plate adapted to be adjusted to extend at an inward inclination more or less across the inlet passage 13 so as to more or less obstruct the passage and deflect the entering air or gas over against the outer or spiral wall 12 of the chamber B.

With this regulator, if the air or gas through the spiral inlet chamber is not adequate for efficient separation, the regulating plate 40 can be set to obstruct the inlet sufficiently to give the required velocity of the air or gas. Thus, if the machine which is designed to handle a definite volume of gas is operated at a lower capacity, efficient separation can be obtained simply by appropriately adjusting the regulator 40. We have also found that the most efficient velocity of the gas for separation differs with dusts of different character, and the adjustable regulator 40 provides a convenient means for effecting the necessary regulation of the gas velocity.

Rotary or centrifugal scrubbers using liquid for dust removal have long been known, in which the liquid has been introduced into or sprayed by the rotor. In such machines, the liquid, which is heavy in comparison to air or gas, is necessarily pumped to a high head by the speed of the rotor, thereby requiring greatly increased power, according to well known mechanical laws of speed, weight and mass. In our machine, we have found from much experiment that by producing the proper velocities in the spiral inlet chamber and introducing the liquid in that portion instead of in the rotor, highly efficient cleansing results can be obtained and with power consumption only a fraction of that required by former centrifugal scrubbers. In any of its inclined adjustments, the regulator will deflect the air or gas towards the spiral wall.

In the description and in the appended claims, when we refer to the volute spiral chamber or casing, we mean a casing having a spiral wall which is formed in such a manner that the distance between the wall and the periphery of the central opening or periphery of the fan wheel, progressively decreases from the larger radius of the casing to the smaller radius thereof.

We claim as our invention:

1. In a gas purifier, the combination of oppositely arranged spiral chambers which communicate at their central portions and respectively have a gas inlet and a gas outlet at their outer peripheral portions for the admission of gas to one chamber and the discharge of gas from the other chamber, and a centrifugal fan wheel arranged to rotate in one of said chambers and move gas in spiral paths through said chambers in succession from said inlet to said outlet, the spiral wall of each of said chambers having spaced openings through which foreign matter carried by the gas may pass and be separated from the gas, each of said chambers communicating by said openings with an otherwise substantially closed receiving chamber for the foreign matter.

2. In a gas purifier, the combination of oppositely arranged spiral chambers which communicate at their central portions and respectively have a gas inlet and a gas outlet at their outer peripheral portions for the admission of gas to one chamber and the discharge of gas from the other chamber, and a centrifugal fan wheel arranged to rotate in one of said chambers and move the gas in spiral paths through said chambers in succession from said inlet to said outlet, and means for spraying liquid into said spiral chambers, the spiral wall of each of said chambers having spaced openings through which foreign matter carried by the gas may pass and be separated from the gas, each of said chambers communicating by said openings in its spiral wall with a substantially closed receiving chamber for the foreign matter.

3. In a gas purifier the combination of oppositely arranged spiral chambers which communicate at their central portions and respectively have a gas inlet and a gas outlet at their outer peripheral portions for the admission of gas to one chamber and the discharge of gas from the other chamber, a centrifugal fan wheel arranged to rotate in one of said chambers and move gas in spiral paths through said chambers in succession from said inlet to said outlet, the spiral walls of said chambers having spaced openings through which foreign matter carried by the gas may pass, and an otherwise substantially closed chamber communicating by said openings with each of said spiral chambers for receiving foreign matter passing through said openings.

4. In a gas purifier, the combination of a centrifugal fan, a spiral inlet chamber therefor having a gas inlet at its outer peripheral portion and communicating at its central portion with the eye of said fan, whereby the fan causes the gas to travel in a spiral path of decreasing radius through said inlet chamber into the fan casing, the spiral wall of said inlet chamber having spaced openings through which foreign matter carried by the gas may pass and be separated from the gas, and an adjustable regulator for varying the cross sectional area of said gas inlet, said regulator inclining inwardly toward said spiral wall from the opposite side of said gas inlet.

5. In a gas purifier, the combination of a centrifugal fan, a spiral inlet chamber therefor having a gas inlet at its outer peripheral portion and communicating at its central portion with the eye of said fan, whereby the fan causes the gas to travel in a spiral path of decreasing radius through said inlet chamber into the fan casing, the spiral wall of said inlet chamber having spaced openings through which foreign matter carried by the gas may pass and be separated from the gas, and a device which is adjustable to more or less obstruct the gas inlet and is arranged to direct the entering gas towards said spiral wall.

6. A gas purifier comprising a centrifugal fan having a volute spiral casing, and an inlet chamber communicating with the fan casing and having a volute spiral casing, the volute spiral casing of the fan and the inlet chamber being inverted, part of the volute spiral casings of the fan and of the inlet chamber being formed with a plurality of interspaced openings through which foreign matter may pass.

7. A gas purifier comprising a centrifugal fan having a volute spiral casing, an inlet chamber communicating with the fan casing and having a volute spiral casing, the volute spiral casing of the fan and the inlet chamber being inverted, part of the volute spiral casing of the fan and of the inlet chamber being formed with a plurality of interspaced openings through which foreign matter may pass, and a substantially closed receiving chamber surrounding that portion of each of the fan casing and inlet casing which is provided with the interspaced openings.

8. A gas purifier comprising a centrifugal fan having a volute spiral casing, an inlet chamber communicating with the fan casing and having a volute spiral casing, the volute spiral casing of the fan and the inlet chamber being inverted, part of the volute spiral casing of the fan and of the inlet chamber being formed with a plurality of interspaced openings through which foreign matter may pass, and means for spraying liquid into the fan casing and inlet casing.

ALBERT A. CRIQUI.
ROGER T. THORNTON.